(12) United States Patent
Ryu et al.

(10) Patent No.: US 9,287,735 B2
(45) Date of Patent: Mar. 15, 2016

(54) WIRELESS POWER TRANSMISSION SYSTEM AND MULTI-MODE RESONATOR IN WIRELESS POWER TRANSMISSION SYSTEM

(71) Applicant: SAMSUNG ELECTRONICS CO., LTD, Suwon-si (KR)

(72) Inventors: Young Ho Ryu, Yongin-si (KR); Eun Seok Park, Suwon-si (KR); Sang Wook Kwon, Seongnam-si (KR); Ki Young Kim, Yongin-si (KR); Nam Yun Kim, Seoul (KR); Dong Zo Kim, Yongin-si (KR); Byung Chul Park, Seoul (KR); Yun Kwon Park, Dongducheon-si (KR); Jae Hyun Park, Seoul (KR); Chang Wook Yoon, Yongin-si (KR); Jeong Hae Lee, Seoul (KR); Jin Sung Choi, Gimpo-si (KR); Young Tack Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 471 days.

(21) Appl. No.: 13/684,877

(22) Filed: Nov. 26, 2012

(65) Prior Publication Data

US 2013/0134793 A1 May 30, 2013

(30) Foreign Application Priority Data

Nov. 28, 2011 (KR) ........................ 10-2011-0125075

(51) Int. Cl.
*H01F 27/00* (2006.01)
*H02J 17/00* (2006.01)
*H02J 5/00* (2006.01)
*H02J 7/02* (2006.01)

(52) U.S. Cl.
CPC ................. *H02J 17/00* (2013.01); *H02J 5/005* (2013.01); *H02J 7/025* (2013.01)

(58) Field of Classification Search
CPC ....................................................... H02J 5/005
USPC ....................................................... 307/104
See application file for complete search history.

(56) References Cited

U.S. PATENT DOCUMENTS

| | | | | |
|---|---|---|---|---|
| 7,330,090 B2 * | 2/2008 | Itoh et al. | | 333/219 |
| 7,777,571 B2 * | 8/2010 | Gotou et al. | | 330/295 |
| 8,716,900 B2 * | 5/2014 | Kanno | | 307/104 |

FOREIGN PATENT DOCUMENTS

| | | |
|---|---|---|
| JP | 2009-268145 A | 11/2009 |
| KR | 10-2003-0077020 A | 9/2003 |
| KR | 10-2010-0055069 A | 5/2010 |
| KR | 10-2010-0104086 A | 9/2010 |
| KR | 10-2011-0004321 A | 1/2011 |

\* cited by examiner

*Primary Examiner* — Stephen W Jackson
(74) *Attorney, Agent, or Firm* — NSIP Law

(57) ABSTRACT

A wireless power transmission system and a multi-mode resonator in the wireless power transmission system are provided. The multi-mode resonator includes a transmission line portion including unit-cells, the unit-cells including respective ends connected to each other, and each of the unit-cells including a capacitor, an inductor connected in parallel to the capacitor, and a via. The multi-mode resonator further includes a ground conducting portion configured to provide an electrical ground to the transmission line portion through the via of each of the unit-cells.

20 Claims, 20 Drawing Sheets

WIRELESS POWER TRANSMISSION SYSTEM AND MULTI-MODE RESONATOR IN WIRELESS POWER TRANSMISSION SYSTEM

CROSS-REFERENCE TO RELATED APPLICATION(S)

This application claims the benefit under 35 U.S.C. §119 (a) of Korean Patent Application No. 10-2011-0125075, filed on Nov. 28, 2011, in the Korean Intellectual Property Office, the entire disclosure of which is incorporated herein by reference for all purposes.

BACKGROUND

1. Field

The following description relates to a wireless power transmission system and a multi-mode resonator in the wireless power transmission system.

2. Description of Related Art

Various portable electronic products have been released, along with the development of information technologies (IT). Such an environment has led to a surge in a quantity of terminals that are possessed and carried by each individual.

As portable electronic products are diversified and complicated, power charging of a portable device has emerged as an issue. In home appliances, as well as portable devices, data may be transmitted wirelessly; however, power lines are required at all times to transmit power. Additionally, to simultaneously transmit data and overcurrent, an antenna for communication, and a system configured to operate the antenna, are required to be mounted together.

A wireless power transmission technology enabling power supply without using a power line has been increasingly spotlighted. For example, when the wireless power transmission technology is commercialized, power may be easily supplied to a wired charging system that is currently used. Wireless power transmission may enable power charging at any time and anywhere, and may be a first step toward an environment enabling sharing of a power source between devices even without a power source. Additionally, the wireless power transmission may prevent natural and environmental pollution caused by used batteries.

Further, near field communication (NFC) has been spotlighted. NFC may be applied to a cell phone, and may be commercialized. A new antenna and a new system for the NFC may be additionally mounted in a mobile device, and the NFC may be commercialized.

SUMMARY

In one general aspect, there is provided a multi-mode resonator in a wireless power transmission system, the multi-mode resonator including a transmission line portion including unit-cells, the unit-cells including respective ends connected to each other, and each of the unit-cells including a capacitor, an inductor connected in parallel to the capacitor, and a via. The multi-mode resonator further includes a ground conducting portion configured to provide an electrical ground to the transmission line portion through the via of each of the unit-cells.

In another general aspect, there is provided a multi-mode resonator in a wireless power transmission system, the multi-mode resonator including a transmission line portion including a shape of a tetragonal loop. The multi-mode resonator further includes a ground conducting portion configured to provide an electrical ground to the transmission line portion. The transmission line portion further includes a first transmission line including a first inductor, a second transmission line including a first capacitor, a third transmission line including a second inductor, and a fourth transmission line including a second capacitor.

In still another general aspect, there is provided a device in a wireless power transmission system, the device including a multi-mode resonator. The device further includes a system to generate a wireless power, and transmit the wireless power to another device through the multi-mode resonator. The multi-mode resonator includes a transmission line portion including unit-cells, the unit-cells including respective ends connected to each other, and each of the unit-cells including a via. The multi-mode resonator further includes a ground conducting portion configured to provide an electrical ground to the transmission line portion through the via of each of the unit-cells, and shield a magnetic field of the transmission line portion from the system.

In yet another general aspect, there is provided a device in a wireless power transmission system, the device including a multi-mode resonator. The device further includes a system configured to receive a wireless power from another device through the multi-mode resonator, and supply the wireless power to a load. The multi-mode resonator includes a transmission line portion including unit-cells, the unit-cells including respective ends connected to each other, and each of the unit-cells including a via. The multi-mode resonator further includes a ground conducting portion configured to provide an electrical ground to the transmission line portion through the via of each of the unit-cells, and shield a magnetic field of the transmission line portion from the system.

Other features and aspects will be apparent from the following detailed description, the drawings, and the claims.

Figure 1:
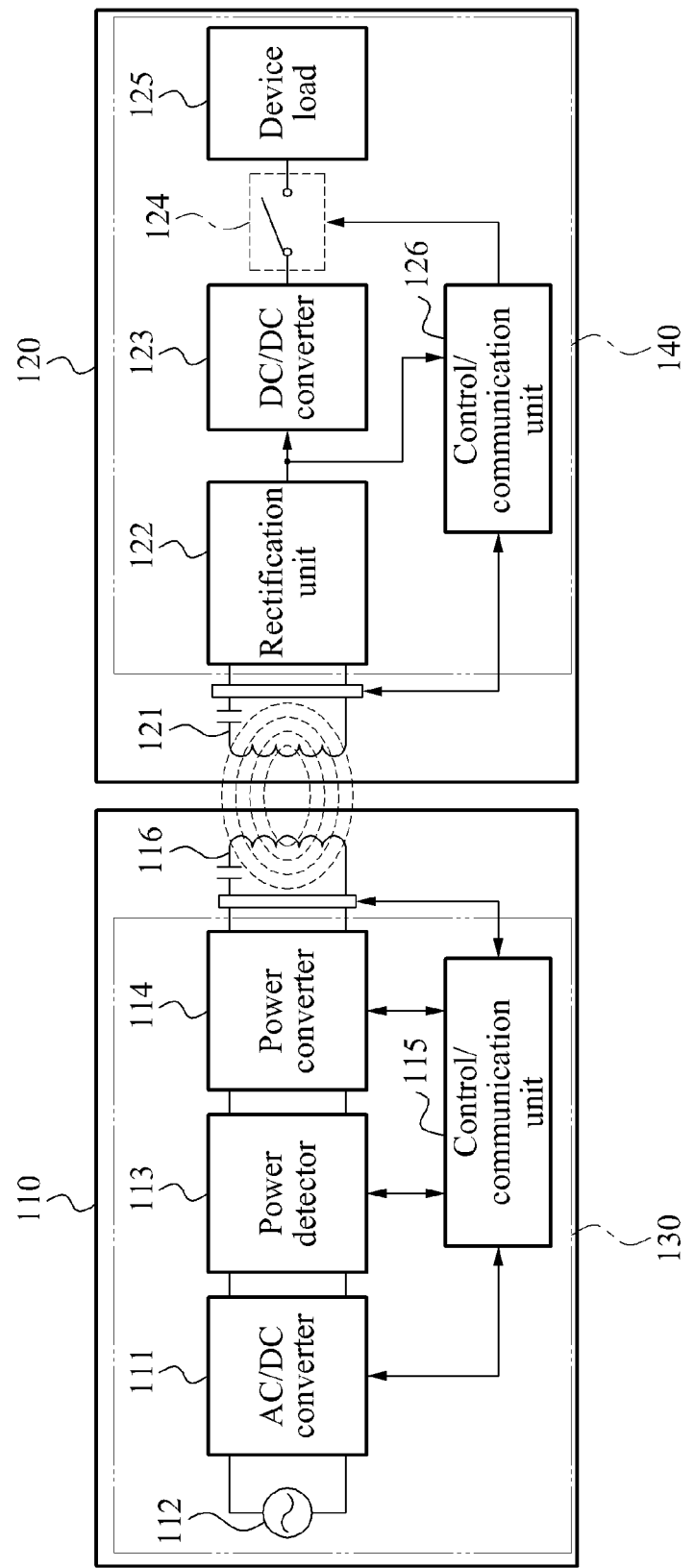
FIG. 1 is a diagram illustrating an example of a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 is a diagram illustrating an example of a wireless power transmission system. Referring to FIG. 1, the wireless power transmission system includes a source device 110 and a target device 120. Referring to FIG. 1, the wireless power transmission and charging system includes a source device 110 and a target device 120. The source device 110 is a device supplying wireless power, and may be any of various devices that supply power, such as pads, terminals, televisions (TVs), and any other device that supplies power. The target device 120 is a device receiving wireless power, and may be any of various devices that consume power, such as terminals, TVs, vehicles, washing machines, radios, lighting systems, and any other device that consumes power.

The source device 110 includes an alternating current-to-direct current (AC/DC) converter 111, a power detector 113, a power converter 114, a control and communication (control/communication) unit 115, and a source resonator 116.

The target device 120 includes a target resonator 121, a rectification unit 122, a DC-to-DC (DC/DC) converter 123, a switch unit 124, a device load 125, and a control/communication unit 126. Additionally, the target device 120 may further include a communication module (not illustrated). The communication module may include a communication circuit, such as, for example, Bluetooth circuit a wireless local area network (WLAN) circuit, and/or any other communication circuit known to one of ordinary skill in the art.

The AC/DC converter 111 generates a DC voltage by rectifying an AC voltage having a frequency of tens of hertz (Hz) output from a power supply 112. The AC/DC converter 111 may output a DC voltage having a predetermined level, or may output a DC voltage having an adjustable level by the control/communication unit 115.

The power detector 113 detects an output current and an output voltage of the AC/DC converter 111, and provides, to the control/communication unit 115, information on the detected current and the detected voltage. Additionally, the power detector 113 detects an input current and an input voltage of the power converter 114.

The power converter 114 generates a power by converting the DC voltage output from the AC/DC converter 111 to an AC voltage using a switching pulse signal having a frequency of a few kilohertz (kHz) to tens of megahertz (MHz). In other words, the power converter 114 converts a DC voltage supplied to a power amplifier to an AC voltage using a reference resonance frequency $F_{Ref}$, and generates a communication power to be used for communication, or a charging power to be used for charging that may be used in a plurality of target devices. The power converter 114 may include a power amplifier configured to amplify the DC voltage based on the switching pulse signal. The communication power may be, for example, a low power of 0.1 to 1 milliwatts (mW) that may be used by a target device to perform communication, and the charging power may be, for example, a high power of 1 mW to 200 Watts (W) that may be consumed by a device load of a target device. In this description, the term "charging" may refer to supplying power to an element or a unit that charges a battery or other rechargeable device with power. Also, the term "charging" may refer supplying power to an element or a unit that consumes power. For example, the term "charging power" may refer to power consumed by a target device while operating, or power used to charge a battery of the target device. The unit or the element may include, for example, a battery, a display device, a sound output circuit, a main processor, and various types of sensors.

The control/communication unit 115 may control a frequency of the switching pulse signal used by the power converter 114.

The control/communication unit 115 may perform out-of-band communication using a communication channel. The control/communication unit 115 may include a communication module, such as a ZigBee module, a Bluetooth module, or any other communication module, that the control/communication unit 115 may use to perform the out-of-band communication. The control/communication unit 115 may transmit or receive data to or from the target device 120 via the out-of-band communication.

The source resonator 116 transfers electromagnetic energy, such as the communication power or the charging power, to the target resonator 121 via a magnetic coupling with the target resonator 121.

The target resonator 121 receives the electromagnetic energy, such as the communication power or the charging power, from the source resonator 116 via a magnetic coupling with the source resonator 116. The communication power may be used to activate a communication function and a control function, and the charging power may be used to perform charging.

A figure of merit (FOM) of the target resonator 121 may satisfy a power dividing ratio of the source device 110. The FOM of the target resonator 121, and the power dividing ratio of the source device 110, will be further described with reference to FIGS. 2 through 10.

The rectification unit 122 generates a DC voltage by rectifying an AC voltage received by the target resonator 121.

The DC/DC converter 123 adjusts a level of the DC voltage output from the rectification unit 122 based on a voltage rating of the device load 125. For example, the DC/DC converter 123 may adjust the level of the DC voltage output from the rectification unit 122 to a level in a range from 3 volts (V) to 10 V.

The switch unit 124 is turned on or off by the control/communication unit 126. When the switch unit 124 is turned off, the control/communication unit 115 of the source device 110 may detect a reflected wave. In other words, when the switch unit 124 is turned off, the magnetic coupling between the source resonator 116 and the target resonator 121 is interrupted.

The device load 125 includes a unit configured to consume power. The device load 125 may include, for example, a battery, a display, a sound output circuit, a main processor, and/or various sensors. For example, when the device load 125 includes a battery, the device load 125 may charge the battery using the DC voltage output from the DC/DC converter 123.

The control/communication unit 126 may be activated by the communication power, e.g., a wake-up power. The control/communication unit 126 communicates with the source device 110, and controls an operation of the target device 120.

The rectification unit 122, the DC/DC converter 123, and the switch unit 124 of FIG. 1 may be referred to as power supply units. Accordingly, the target device 120 may include the target resonator 121 and the power supply units 122, 123 and 124 configured to supply the received power to the device load 125. The device load 125 may be briefly expressed as a load.

In FIG. 1, the source device 110 may be divided into the source resonator 116 and a source system 130. The source resonator 116 may include, for example, a multi-mode resonator including unit-cells that will be described below. The source system 130 may generate wireless power, and may transmit the wireless power to the target device 120 through the source resonator 116, namely, the multi-mode resonator.

Additionally, the target device 120 may be divided into the target resonator 121 and a target system 140. The target resonator 121 may include, for example, a multi-mode resonator including unit-cells that will be described below. The target system 140 may receive wireless power from the source device 110 through the target resonator 121, namely, the multi-mode resonator, and may supply the received wireless power to the load.

Figure 2:
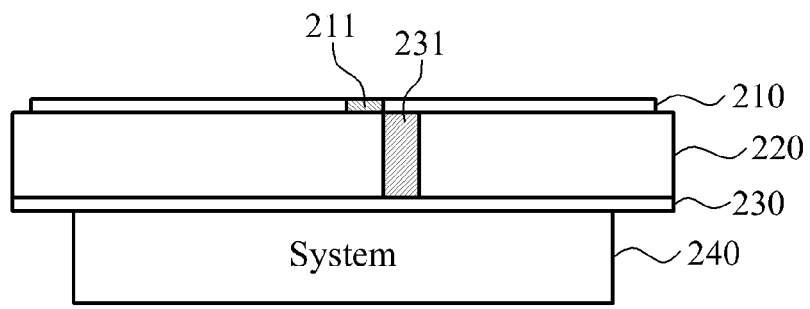
FIG. 2 is a diagram illustrating an example of a relationship between a multi-mode resonator and a system.

FIG. 2 is a diagram an example of a relationship between a multi-mode resonator and a system 240. In more detail, FIG. 2 illustrates a side or a cross section of the multi-mode resonator formed over the system 240. The multi-mode resonator may correspond to the source resonator 116 or the target resonator 121 of FIG. 1. The system 240 may correspond to the source system 130 or the target system 140 of FIG. 1.

The multi-mode resonator includes a transmission line portion 210, a substrate 220, and the ground conducting portion 230.

The transmission line portion 210 may include a conductor, and is split into unit-cells including respective ends that are connected to each other. Additionally, the transmission line portion 210 includes a first capacitor 211 formed between the unit-cells.

The substrate 220 is formed between the transmission line portion 210 and the ground conducting portion 230, and may include ferrite to increase a power transmission efficiency of the system 240. A via 231 is formed through the substrate 220. The transmission line portion 210 and the ground conducting portion 230 are electrically connected to each other through the via 231.

The ground conducting portion 230 may include a conductor. Additionally, the ground conducting portion 230 provides an electrical ground to the transmission line portion 210.

The ground conducting portion 230 shields the system 240 from a magnetic field generated by the transmission line portion 210. Therefore, a source device or a target device, including the multi-mode resonator, may be insensitive to a surrounding environment, and an electromagnetic interference (EMI)/electromagnetic compatibility (EMC) problem may also be solved.

Figure 3:
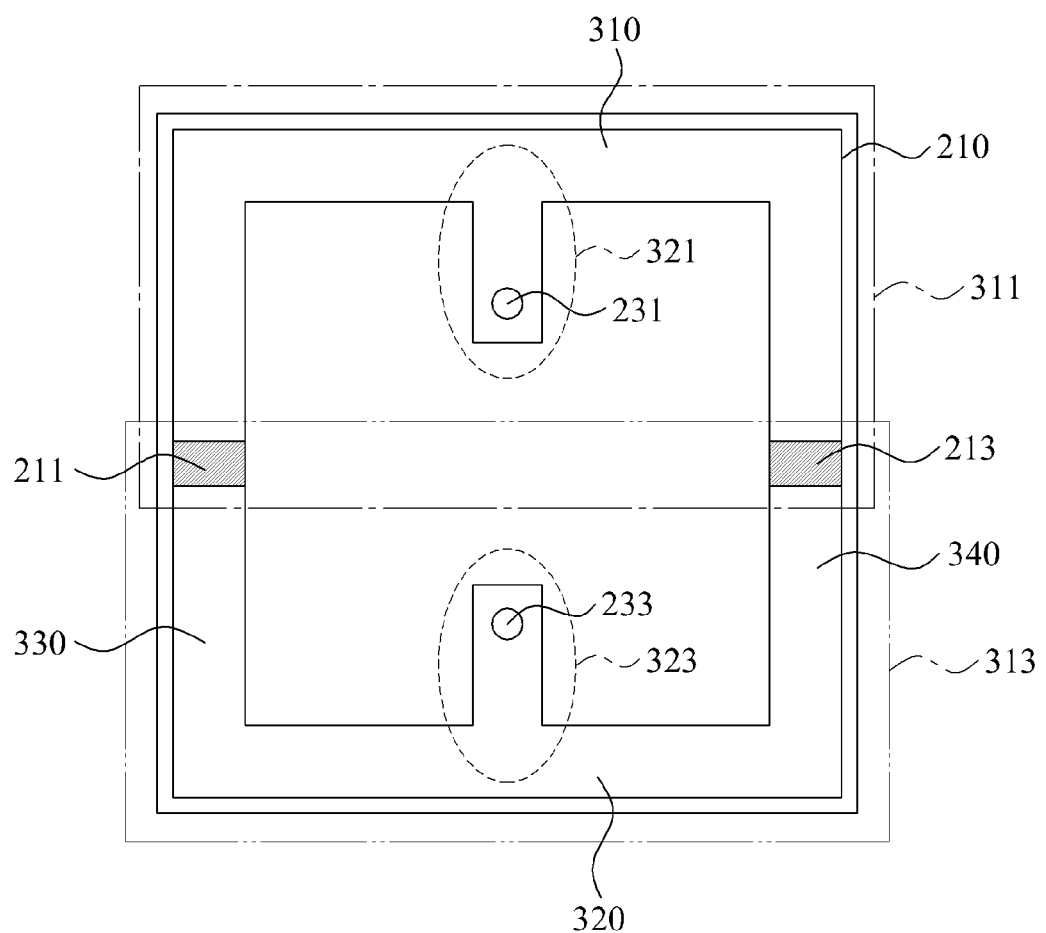
FIG. 3 is a diagram illustrating an example of a top of the multi-mode resonator of FIG. 2.

FIG. 3 is a diagram illustrating an example of a top of the multi-mode resonator of FIG. 2. Referring to FIG. 3, the multi-mode resonator includes two unit-cells 311 and 313. As described above, the transmission line portion 210 includes the unit-cells, e.g., the two unit-cells 311 and 313.

The transmission line portion 210 may include a shape of a tetragonal loop, but is not limited to such a shape. Accordingly, the transmission line portion 210 may include various shapes, such as, for example, a circular shape, a rectangular shape, a polygonal shape, and/or other shapes known to one of ordinary skill in the art.

The transmission line portion 210 further includes a a first transmission line 310, a second transmission line 330, a third transmission line 320, and a fourth transmission line 340. Moreover, the transmission line portion 210 includes a first inductor 321, the first capacitor 211, a second inductor 323, and a second capacitor 213 that are respectively formed in the first transmission line 310, the second transmission line 330, the third transmission line 320, and the fourth transmission line 340. The via 231 and a via 233 are formed in an end of the first inductor 321 and an end of the second inductor 323, respectively.

As illustrated in FIG. 3, the first transmission line 310, the second transmission line 330, the third transmission line 320, and the fourth transmission line 340 are connected to each other, to form the tetragonal loop. Accordingly, respective ends of the two unit-cells 311 and 313 are connected to each other.

Since the respective ends of the two unit-cells 311 and 313 are connected to each other, both a mu-zero resonance (MZR) mode and an epsilon-zero resonance (EZR) mode, of the multi-mode resonator, may be simultaneously generated. That is, the unit-cells 311 and 313 may enable the multi-mode resonator to be operated simultaneously in the MZR mode and the EZR mode. For example, when the unit-cell 311 is operated in the MZR mode, the unit-cell 313 may be operated in the EZR mode. The MZR mode may correspond to a power transmission mode, and the EZR mode may correspond to a communication mode.

Figure 4:
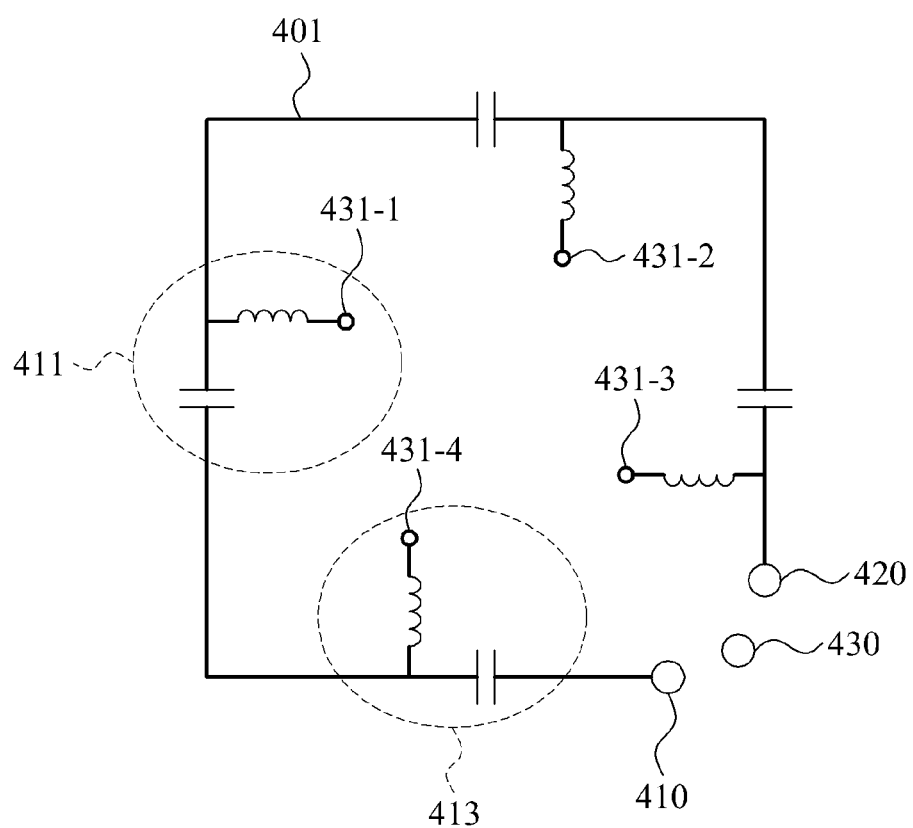
FIG. 4 is a circuit diagram illustrating an example of a multi-mode resonator including unit-cells.

FIG. 4 is a circuit diagram illustrating an example of a multi-mode resonator including unit-cells. Referring to FIG. 4, the multi-mode resonator includes a transmission line portion 401 that includes the unit-cells. Respective ends of the unit-cells are connected to each other.

For example, the unit-cells may include a first unit-cell 411 and a second unit-cell 413. The first unit-cell 411 may be operated in a power transmission mode (e.g., a MZR mode) to transmit wireless power to a corresponding resonator using a resonance scheme. The second unit-cell 413 may be operated in a communication mode (e.g., an EZR mode) to transmit data to the corresponding resonator. The wireless power and the data may be simultaneously transmitted. In this example, a resonant frequency of the communication mode may be changed due to a change in an inductance of an inductor of the second unit-cell 413, and a resonant frequency of a power transmission mode may remain unchanged regardless of the change in the inductance of an inductor of the first unit-cell 411. In other words, the first and second unit-cells 411 and 413 may simultaneously generate the MZR mode and the EZR mode, respectively. Additionally, the corresponding resonator may correspond to a target resonator corresponding to a source resonator, or a source resonator corresponding to a target resonator.

Each of the unit-cells may include a capacitor, an inductor connected in parallel to the capacitor, and a via 431-1, 431-2, 431-3, or 431-4 formed in an end of the inductor. For example, the first unit-cell 411 and the second unit-cell 413 include the via 431-1 and the via 431-4, respectively, along with respective capacitors and inductors that are connected in parallel. Each inductor may be formed by a stub connected to the transmission line portion 401. Each inductor may include, for example, a shunt inductor or a lumped inductor. Each of the unit-cells may be configured to share at least one of the capacitors. Each capacitor may include, for example, a distributed capacitor or a lumped capacitor.

Although not clearly illustrated in FIG. 4, the multi-mode resonator further includes a ground conducting portion configured to provide an electrical ground to the transmission line portion 401 through the vias 431-1, 431-2, 431-3, and 431-4.

Referring again to FIG. 4, the multi-mode resonator further includes a first port 410, a second port 420, and a ground port 430. The multi-mode resonator is fed through a connection to the first port 410 and the ground port 430, and the second port 420 is connected to the ground.

Figure 5:
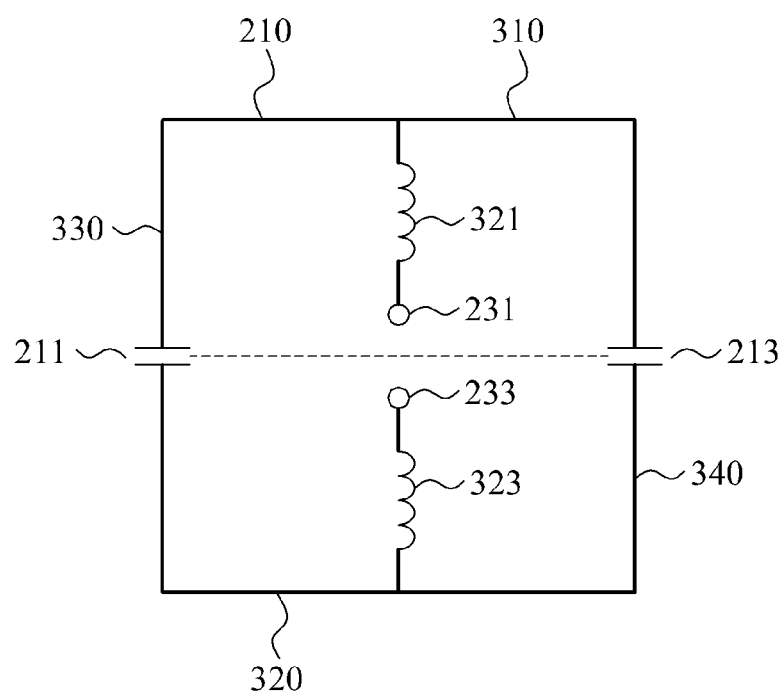
FIG. 5 is a circuit diagram illustrating an example of a multi-mode resonator.
Figure 6:
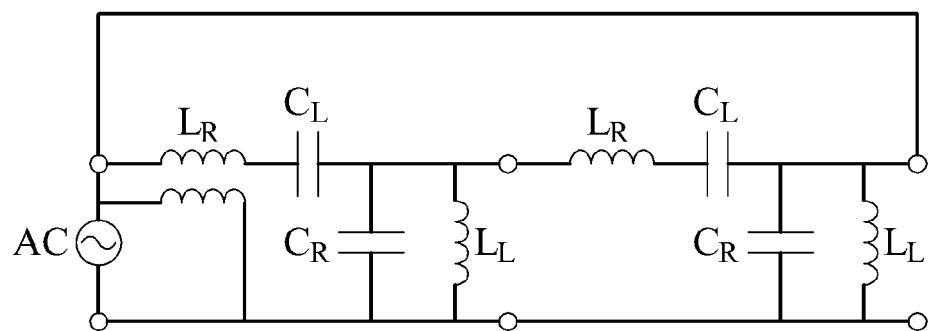
FIG. 6 is a circuit diagram illustrating an example of an equivalent circuit of the multi-mode resonator of FIG. 5.

FIG. 5 is a circuit diagram illustrating an example of a multi-mode resonator, and FIG. 6 is a circuit diagram illustrating an example of an equivalent circuit of the multi-mode resonator of FIG. 5. The multi-mode resonator may simultaneously transmit and receive power and data using various modes that may be generated in the single multi-mode resonator. The multi-mode resonator may correspond to the multi-mode resonator of FIGS. 2-3.

Referring to FIGS. 2 and 5, the multi-mode resonator includes the transmission line portion 210, which includes the first transmission line 310, the second transmission line 330, the third transmission line 320, and the fourth transmission line 340. Moreover, the transmission line portion 210 includes the first inductor 321, the first capacitor 211, the second inductor 323, and the second capacitor 213 that are respectively formed in the first transmission line 310, the second transmission line 330, the third transmission line 320, and the fourth transmission line 340. The via 231 and the via 233 are formed in the end of the first inductor 321 and the end of the second inductor 323, respectively.

A composite right/left-handed (CRLH) transmission line (e.g., the transmission line portion 210) may be configured by adding a left-handed (LH) element to a right-handed (RH) transmission line (e.g., the first transmission line 310). The LH element may include, for example, capacitors (e.g., the first capacitor 211) connected in series, and inductors (e.g., the first inductor 321) connected in parallel. Due to the LH element, the CRLH transmission line may include LH and RH transmission characteristics. Additionally, zeroth-order resonance characteristics, namely, a MZR mode and an EZR mode, may be exhibited in a frequency in which a permittivity and a magnetic permeability become zero between a LH transmission band and a RH transmission band. For example, when a CRLH metamaterial (MTM) resonator includes the CRLH transmission line that includes the various transmission characteristics and the various resonance characteristics, various resonance modes may be generated in the single CRLH MTM resonator.

Resonance modes Bd and a dispersion curve of the CRLH transmission line may be determined based on the following Equation 1:

$$\beta d = \cos^{-1}\left\{1 - \frac{1}{2}\left[\frac{\omega_L^2}{\omega^2} + \frac{\omega^2}{\omega_R^2} - \left(\frac{\omega_E^2}{\omega_R^2} + \frac{\omega_M^2}{\omega_R^2}\right)\right]\right\} \quad (1)$$

$\omega_R = 1/\sqrt{L_R C_R}$, $\omega_L = 1/\sqrt{L_L C_L}$, $\omega_M = 1/\sqrt{L_R C_L}$, $\omega_E = 1/\sqrt{L_L C_R}$ In Equation 1, $L_R$ and $L_L$ denote inductances of a unit-cell of the CRLH transmission line, and $C_R$ and $C_L$ denote capacitances of the unit-cell.

A resonance mode $\beta_n d$ may be defined based on the following Equation 2:

$$\beta_n d = \frac{n\pi}{N} \quad (2)$$

In Equation 2, n denotes a number of a resonance mode, $n = \pm 0, \pm 1, \pm 2, \ldots, \pm(N-1)$, and N denotes a number of unit-cells of the CRLH transmission line.

The CRLH MTM resonator may generate the EZR mode and the MZR mode based on boundary conditions, respectively, defined based on the following Equation 3:

open-ended boundary condition $$Z_{IN} = \frac{1}{N}\left(j\omega L_L + \frac{1}{j\omega C_R}\right), \omega_{BZR} = \frac{1}{\sqrt{L_L C_R}}$$

Short-ended boundary condition.

$$Z_{IN} = \frac{1}{N}\left(j\omega L_R + \frac{1}{j\omega C_L}\right), \omega_{MZR} = \frac{1}{\sqrt{L_L C_L}} \quad (3)$$

An example of a N-cell CRLH MTM resonator has been described above with reference to FIGS. 2 through 5. Hereinafter, for convenience of description, an example of a 2-cell CRLH multi-mode resonator including two unit-cells will be described.

If only a short-ended boundary condition or an open-ended boundary condition is applied, a CRLH resonator may generate only a single mode. On the other hand, the 2-cell CRLH multi-mode resonator may generate a −1 mode, an MZR mode, an EZR mode, and a +1 mode.

Respective ends of the two unit-cells of the 2-cell CRLH multi-mode resonator are connected to each other, and accordingly, two zeroth-order (ZOR) modes may be generated based on a scheme of configuring a power feeder. The two ZOR modes include the MZR mode and the EZR mode.

As a number of unit-cells increases, a number of resonance modes that may be generated also increases. A number n of a resonance mode may be defined as $n = \pm 0, \pm 1, \pm 2, \ldots, \pm(N-1)$ in which N denotes the number of the unit-cells.

Referring again to FIG. 5, the first transmission line 310 through the fourth transmission line 340 correspond to RH transmission lines. In the equivalent circuit of FIG. 6, a RH transmission line may be expressed as a series inductor $L_R$ and a shunt capacitor $C_R$ connected to the ground that include an inductance and a capacitance, respectively, of the RH transmission line.

Referring again to FIG. 5, the first capacitor 211 and the second capacitor 213 may include respective lumped capacitors as LH elements. In the equivalent circuit of FIG. 6, a lumped capacitor may be expressed as a series capacitor $C_L$.

Referring again to FIG. 5, the first inductor 321 and the second inductor 323 may include respective stubs, connected to the respective vias 231 and 233, as LH elements. In the equivalent circuit of FIG. 6, a stub and a via may be expressed as a shunt inductor $L_L$ connected to the ground. The stubs may also include respective lumped inductors.

A power feeder configured to generate multiple resonance modes may include the same configuration as an AC source of FIG. 6. For example, when the power feeder or a feeding port is formed as illustrated in FIG. 6, the MZR mode and the EZR mode may be simultaneously generated.

Referring again to FIG. 6, in the MZR mode, when a current flows to the multi-mode resonator including the series inductor $L_R$ and the shunt inductor $L_L$, a loop is formed in the form of the equivalent circuit, and the multi-mode resonator is activated to perform magnetic coupling. The MZR mode will be further described with respect to FIGS. 10 and 11. Additionally, in the EZR mode, resonance by the series inductor $L_R$ and the series capacitor $C_L$ acts as a short due to an increase in a frequency, and feeding is performed in the shunt inductor $L_L$ and the shunt capacitor $C_R$. The EZR mode will be further described with respect to FIGS. 12 and 13.

Figure 7:
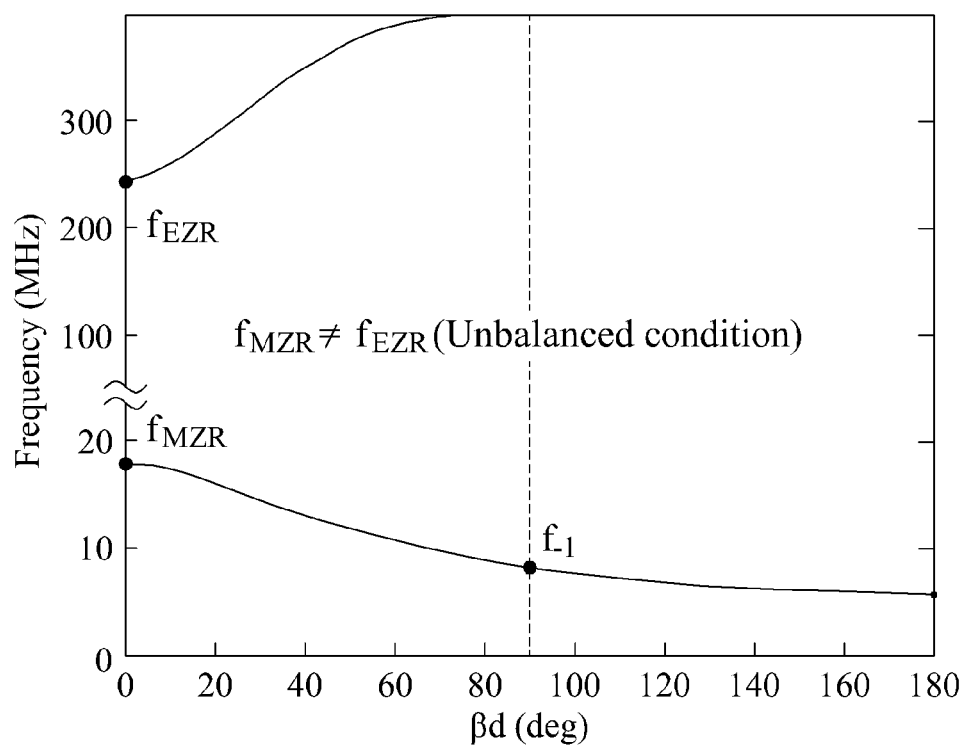
FIG. 7 is a graph illustrating an example of a distribution characteristic of a multi-mode resonator.

FIG. 7 is a graph illustrating an example of a distribution characteristic of a multi-mode resonator. Referring to FIG. 7, a 2-cell CRLH multi-mode resonator may generate a total of four modes, for example, a −1 mode, an MZR mode, an EZR mode, and a +1 mode at different respective resonant frequencies (to satisfy an unbalanced condition). However, the +1 mode is not illustrated in FIG. 7.

For example, the −1 mode and the EZR mode may be used for near field communication (NFC). The MZR mode may be used for power transmission and in-band communication. The in-band communication may include communication to transmit and receive data using a resonant frequency. The +1 mode may be used for radio frequency (RF) communication or for NFC.

Figure 8:
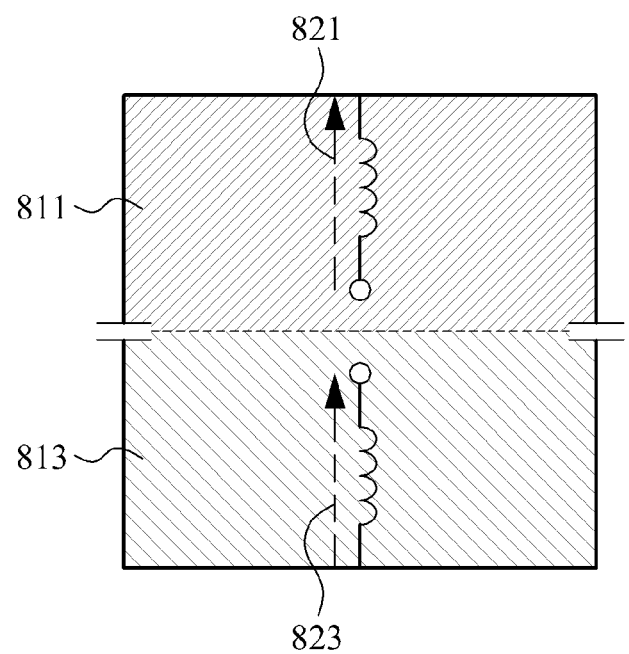
FIGS. 8 and 9 are diagrams illustrating an example of a −1 mode of a multi-mode resonator.
Figure 9:
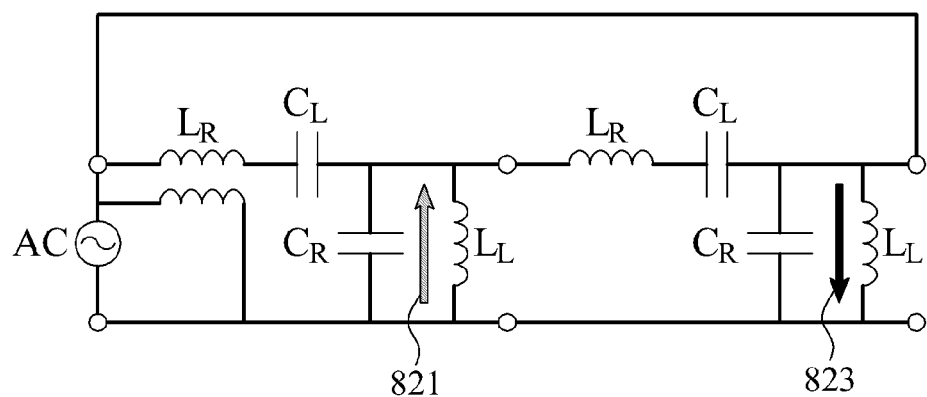

FIGS. 8 and 9 are diagrams illustrating an example of a −1 mode of a multi-mode resonator. In the −1 mode, electrical polarities of unit-cells 811 and 813 are opposite to each other. Accordingly, in the unit-cells 811 and 813, respective currents 821 and 823 that include a phase difference of 180° are generated.

Figure 10:
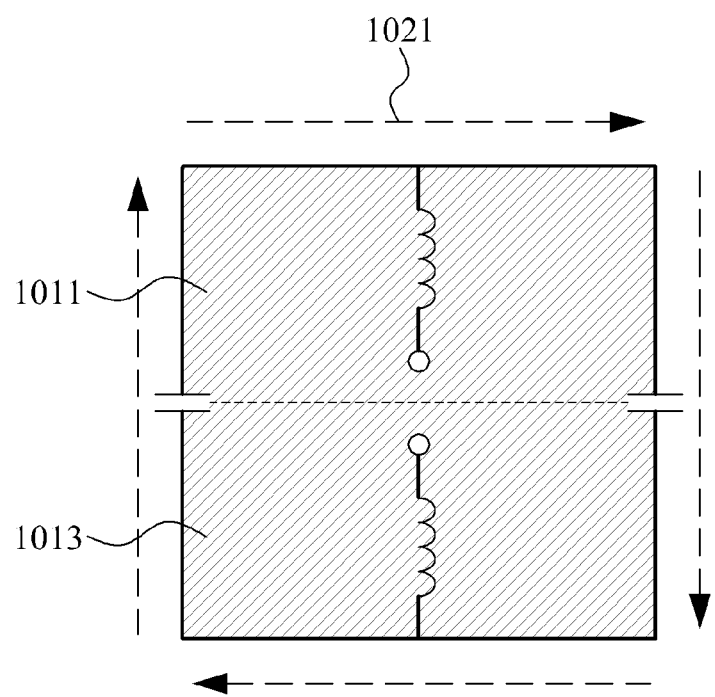
FIGS. 10 and 11 are diagrams illustrating an example of a mu-zero resonance (MZR) mode of a multi-mode resonator.
Figure 11:
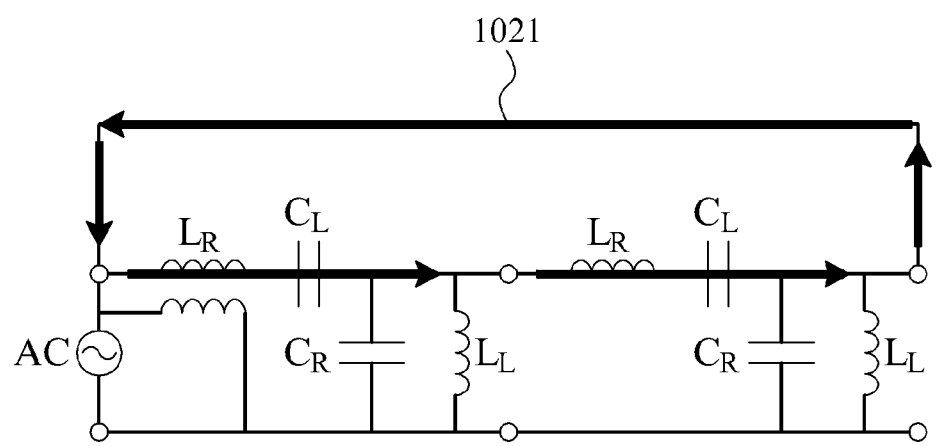

FIGS. 10 and 11 are diagrams illustrating an example of an MZR mode of a multi-mode resonator. In the MZR mode, a series LC resonance of unit-cells 1011 and 1013 generates a current 1021 that flows in the same direction in the unit-cells 1011 and 1013. That is, the current 1021 including the same phase is generated. As illustrated in FIG. 11, the current 1021 flows in the form of a loop. Therefore, the MZR mode may be a suitable resonance mode to transfer power using magnetic coupling in wireless power transmission.

Figure 12:
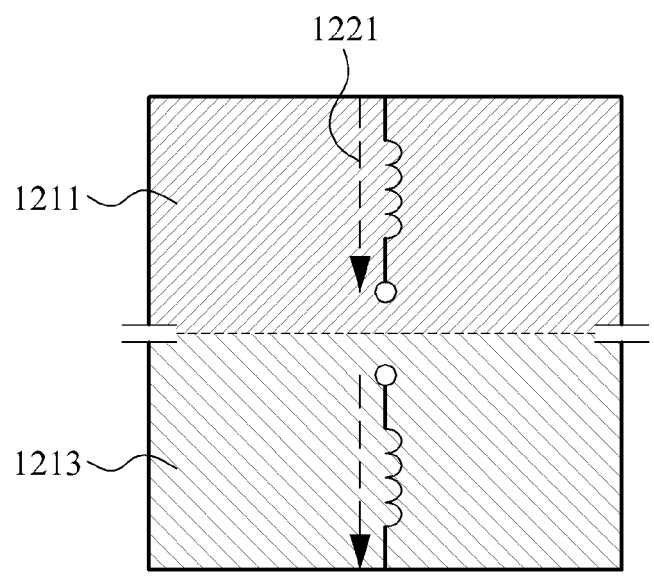
FIGS. 12 and 13 are diagrams illustrating an example of an epsilon-zero resonance (EZR) mode of a multi-mode resonator.
Figure 13:
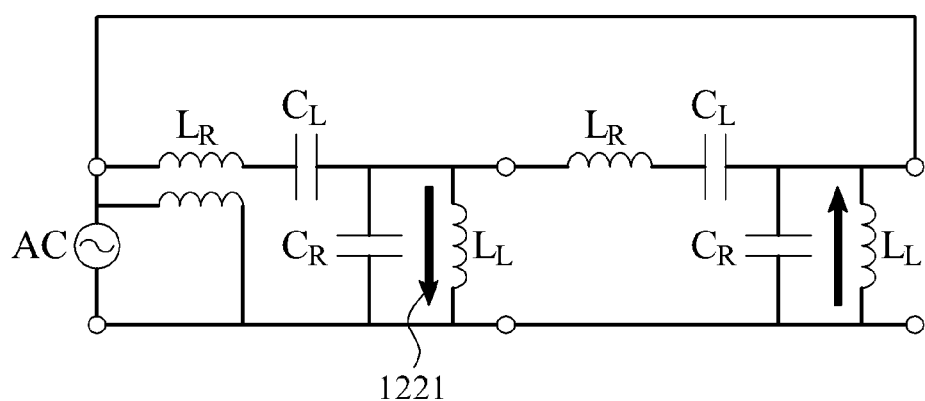

FIGS. 12 and 13 are diagrams illustrating an example of an EZR mode of a multi-mode resonator. In the EZR mode, a parallel admittance of unit-cells 1211 and 1213 generates a surface current 1221 that flows through respective inductors and vias. For example, as illustrated in FIG. 13, the surface current 1221 flows through the two shunt inductors $L_L$ in a direction indicated by arrows.

Since a distribution characteristic of a CRLH transmission line may be represented in an order of an LH transmission band, a ZOR mode, and an RH transmission band, a −1 mode may be generated at a lowest frequency, as shown in FIG. 7. Additionally, in the MZR mode and the EZR mode, each frequency may be determined based on a series resonance and a parallel admittance, respectively, and accordingly, it is possible to flexibly configure the MZR mode and the EZR mode between the LH transmission band and the RH transmission band.

Figure 14:
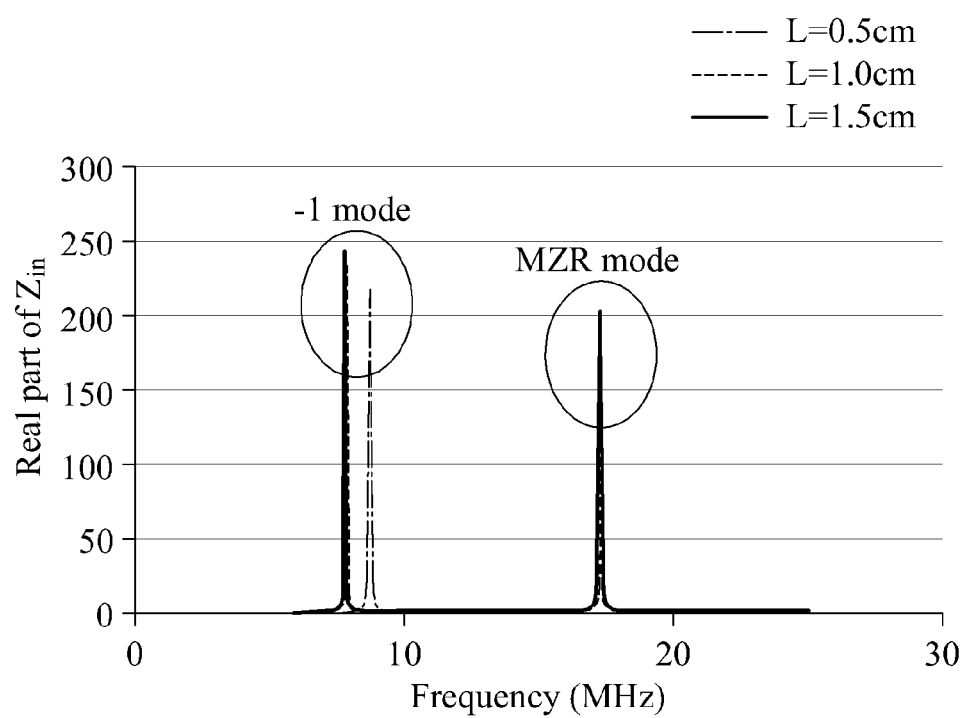
FIGS. 14 and 15 are graphs illustrating an example of a change in a resonant frequency based on an element value of a multi-mode resonator.
Figure 15:
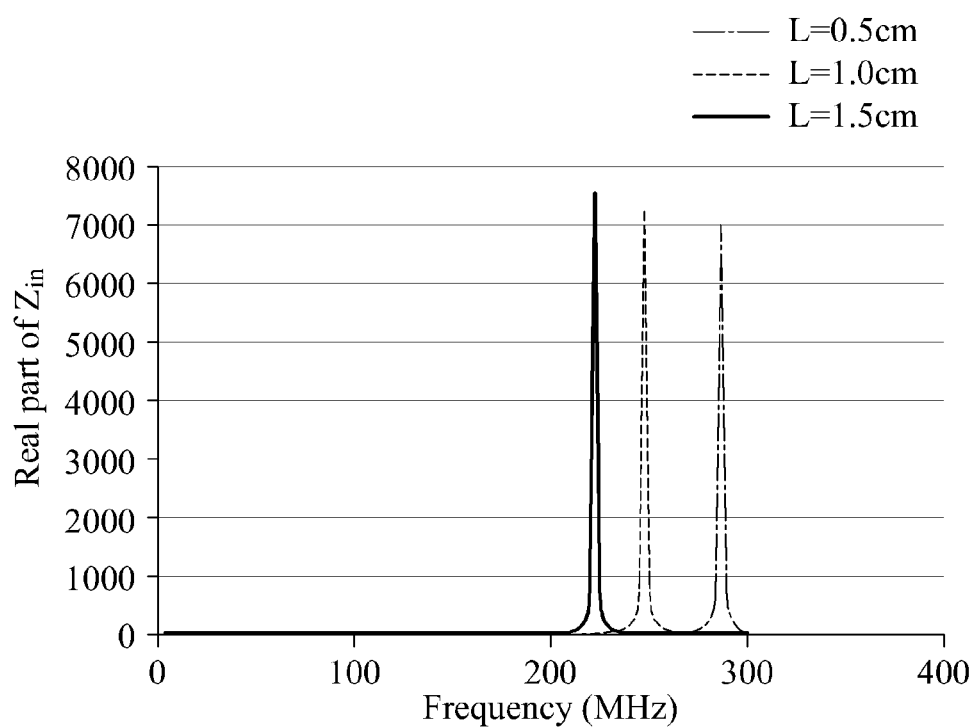

FIGS. 14 and 15 are graphs illustrating an example of a change in a resonant frequency based on an element value of a multi-mode resonator. In more detail, FIG. 14 illustrates examples of resonant frequencies measured in the −1 mode and the MZR mode, respectively, and FIG. 15 illustrates examples of resonant frequencies measured in the EZR mode.

For example, when an inductor $L_L$ of the multi-mode resonator is changed in, e.g., length, the resonant frequency in the MZR mode remains unchanged, but the resonant frequencies in the −1 mode and the EZR mode are changed. Accordingly, the MZR mode, namely, a mode to transfer power, may be fixed to transfer power, whereas a resonant frequency for communication may be adjusted arbitrarily by a designer based on which communication frequency is used. Accordingly, the multi-mode resonator may transfer power and perform communication in a resonant frequency that is lower than that in a 0 mode, which may assist in miniaturization.

According to the teachings above, there is provided a single resonator that may be operated in multiple modes to simultaneously transmit and receive data and power. Additionally, the single resonator may change a communication frequency by adjusting a parameter. Thus, the single resonator may be configured with various standards.

Furthermore, the single resonator may be used for various communication services based on the multiple modes. Moreover, the single resonator shields a magnetic field using a ground portion, and thus, it is possible to transfer power and perform communication without affecting a surrounding environment or being affected by the surrounding environment. Therefore, an EMI/EMC problem may be naturally solved.

Figure 16A:
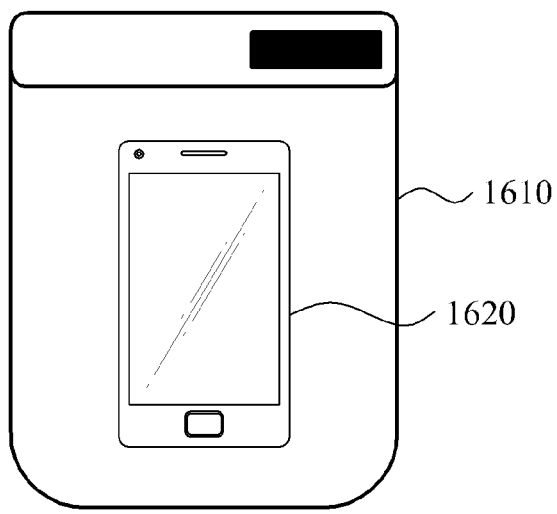
FIGS. 16A through 17B are diagrams illustrating examples of applications in which a wireless power receiver and a wireless power transmitter are mounted.

FIGS. 16A through 17B are diagrams illustrating examples of applications in which a wireless power receiver and a wireless power transmitter are mounted. FIG. 16A illustrates an example of wireless power charging between a pad 1610 and a mobile terminal 1620, and FIG. 16B illustrates an example of wireless power charging between pads 1630 and 1640 and hearing aids 1650 and 1660, respectively.

Referring to FIG. 16A, a wireless power transmitter is mounted in the pad 1610, and a wireless power receiver is mounted in the mobile terminal 1620. The pad 1610 charges a single mobile terminal, namely, the mobile terminal 1620.

Figure 16B:
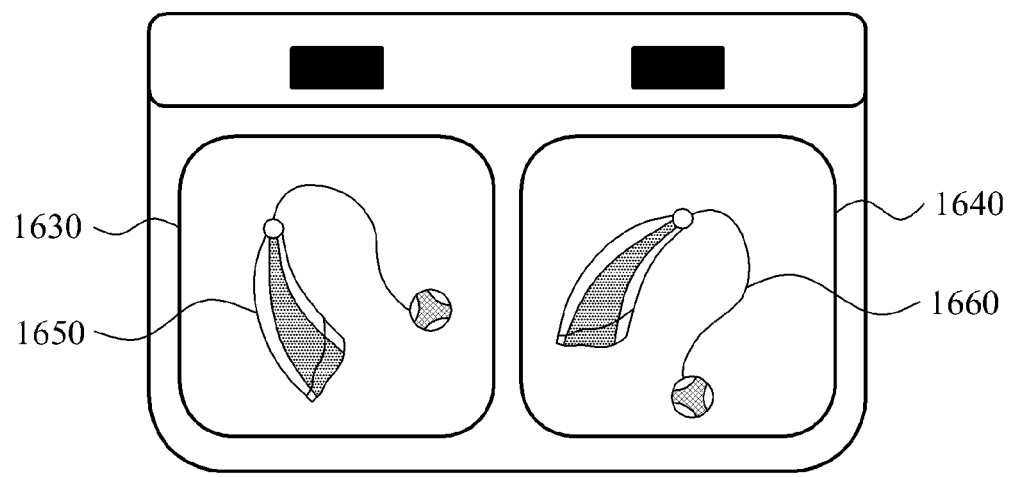

Referring to FIG. 16B, two wireless power transmitters are respectively mounted in the pads 1630 and 1640. The hearing aids 1650 and 1660 are used for a left ear and a right ear, respectively. Two wireless power receivers are respectively mounted in the hearing aids 1650 and 1660. The pads 1630 and 1640 charge two hearing aids, respectively, namely, the hearing aids 1650 and 1660.

Figure 17A:
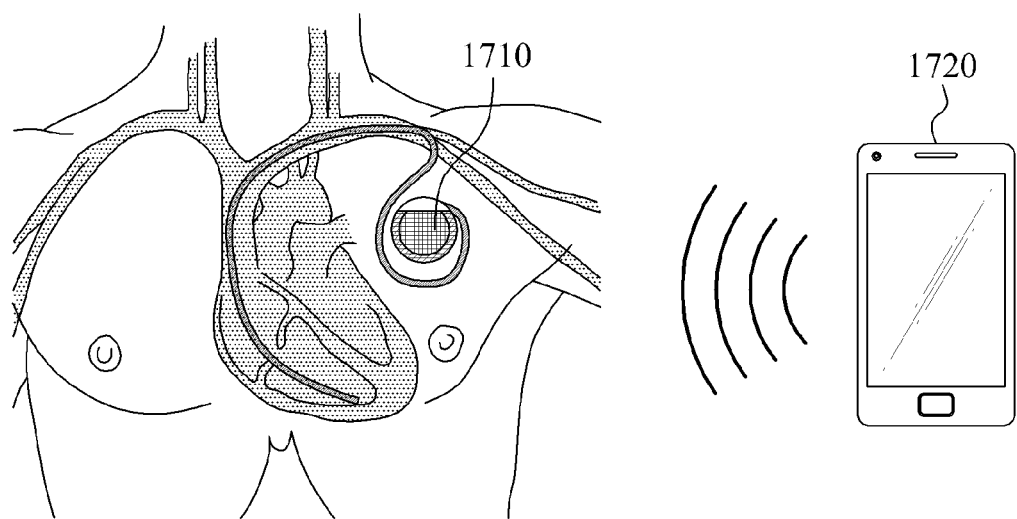
Figure 17B:
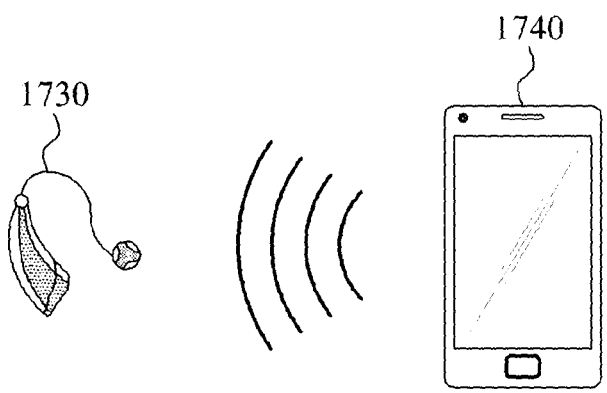

FIG. 17A illustrates an example of wireless power charging between an electronic device 1710 inserted into a human body, and a mobile terminal 1720. FIG. 17B illustrates an example of wireless power charging between a hearing aid 1730 and a mobile terminal 1740.

Referring to FIG. 17A, a wireless power transmitter and a wireless power receiver are mounted in the mobile terminal 1720. Another wireless power receiver is mounted in the electronic device 1710. The electronic device 1710 is charged by receiving power from the mobile terminal 1720.

Referring to FIG. 17B, a wireless power transmitter and a wireless power receiver are mounted in the mobile terminal 1740. Another wireless power receiver is mounted in the hearing aid 1730. The hearing aid 1730 is charged by receiving power from the mobile terminal 1740. Low-power electronic devices, for example, Bluetooth earphones, may also be charged by receiving power from the mobile terminal 1740.

Figure 18:
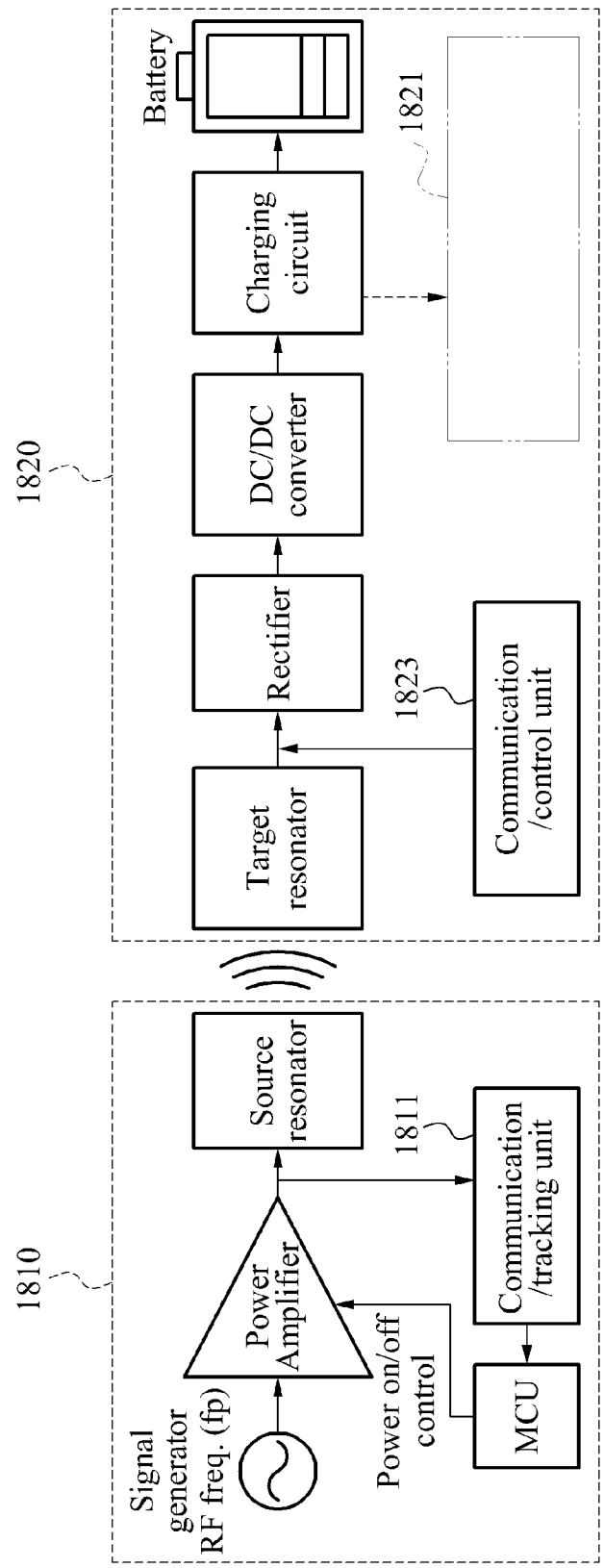
FIG. 18 is a diagram illustrating an example of a wireless power transmitter and a wireless power receiver.

FIG. 18 is a diagram illustrating an example of a wireless power transmitter and a wireless power receiver. Referring to FIG. 18, a wireless power transmitter 1810 may be mounted in each of the pad 1610 of FIG. 16A and pads 1630 and 1640 of FIG. 16B. Additionally, the wireless power transmitter 1810 may be mounted in each of the mobile terminal 1720 of FIG. 17A and the mobile terminal 1740 of FIG. 17B.

In addition, a wireless power receiver 1820 may be mounted in each of the mobile terminal 1620 of FIG. 16A and the hearing aids 1650 and 1660 of FIG. 16B. Further, the wireless power receiver 1820 may be mounted in each of the electronic device 1710 of FIG. 17A and the hearing aid 1730 of FIG. 17B.

The wireless power transmitter 1810 may include a similar configuration to the source device 110 of FIG. 1. For example, the wireless power transmitter 1810 may include a unit configured to transmit power using magnetic coupling.

Referring to FIG. 18, the wireless power transmitter 1810 includes a signal generator, a power amplifier, a microcontroller unit (MCU), a source resonator, and a communication/tracking unit 1811. The communication/tracking unit 1811 communicates with the wireless power receiver 1820, and controls an impedance and a resonance frequency to maintain a wireless power transmission efficiency. Additionally, the communication/tracking unit 1811 may perform similar functions to the power converter 114 and the control/communication unit 115 of FIG. 1.

The wireless power receiver 1820 may include a similar configuration to the target device 120 of FIG. 1. For example, the wireless power receiver 1820 may include a unit configured to wirelessly receive power and to charge a battery.

Referring to FIG. 18, the wireless power receiver 1820 includes a target resonator, a rectifier, a DC/DC converter, and a charging circuit. Additionally, the wireless power receiver 1820 includes a communication/control unit 1823. The communication/control unit 1823 communicates with the wireless power transmitter 1810, and performs an operation to protect overvoltage and overcurrent.

The wireless power receiver 1820 may include a hearing device circuit 1821. The hearing device circuit 1821 may be charged by a battery. The hearing device circuit 1821 may include a microphone, an analog-to-digital converter (ADC), a processor, a digital-to-analog converter (DAC), and a receiver. For example, the hearing device circuit 1821 may include the same configuration as a hearing aid.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal or a device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multi-mode resonator in a wireless power transmission system, the multi-mode resonator comprising:
   a transmission line portion comprising unit-cells, wherein each unit-cell comprises
     a respective end connected to another unit-cell,
     a capacitor,
     an inductor connected in parallel to the capacitor, and
     a via; and
   a ground conducting portion configured to provide an electrical ground to the transmission line portion through the via of each of the unit-cells;
   wherein the multi-mode resonator is configured to generate a resonance mode configured to be used with any of a communication and a power transmission.

2. The multi-mode resonator of claim 1, wherein the inductor comprises a stub connected to the transmission line portion.

3. The multi-mode resonator of claim 1, wherein the unit-cells comprise:
   a first unit-cell configured to operate in a power transmission mode to transmit a wireless power to another resonator using a resonance scheme; and
   a second unit-cell configured to operate in a communication mode to transmit data to the other resonator;
   wherein the wireless power and the data are simultaneously transmitted.

4. The multi-mode resonator of claim 3, wherein:
   a resonant frequency of the communication mode is changed when an inductance of the inductor of the second unit-cell is changed; and a resonant frequency of the power transmission mode is unchanged when an inductance of the inductor of the first unit-cell is changed.

5. The multi-mode resonator of claim 1, wherein:
the unit-cells are configured to operate in a −1 mode, a mu-zero resonance (MZR) mode, an epsilon-zero resonance (EZR) mode, and a +1 mode, respectively; and
the MZR mode and the EZR mode are simultaneously operated.

6. The multi-mode resonator of claim 1, wherein the via is formed at an end of the inductor.

7. A multi-mode resonator in a wireless power transmission system, the multi-mode resonator comprising:
a transmission line portion comprising
a shape of a tetragonal loop,
a first transmission line comprising a first inductor,
a second transmission line comprising a first capacitor,
a third transmission line comprising a second inductor, and
a fourth transmission line comprising a second capacitor; and
a ground conducting portion configured to provide an electrical ground to the transmission line portion;
wherein the multi-mode resonator is configured to generate a resonance mode configured to be used with any of a communication and a power transmission.

8. A device in a wireless power transmission system, the device comprising:
a multi-mode resonator comprising
a transmission line portion comprising unit-cells, wherein unit-cell comprises a via and a respective end connected to another unit-cell, and
a ground conducting portion configured to provide an electrical ground to the transmission line portion through the via of each of the unit-cells, and shield a magnetic field of the transmission line portion from the system; and
a system to generate a wireless power, and to transmit the wireless power to another device through the multi-mode resonator;
wherein the multi-mode resonator is configured to generate a resonance mode configured to be used with any of a communication and a power transmission.

9. The device of claim 8, wherein each of the unit-cells further comprises:
a capacitor; and
an inductor connected in parallel to the capacitor.

10. The device of claim 9, wherein the unit-cells comprise:
a first unit-cell configured to operate in a power transmission mode to transmit the wireless power to another resonator using a resonance scheme; and
a second unit-cell configured to operate in a communication mode to transmit data to the other resonator;
wherein the wireless power and the data are simultaneously transmitted.

11. The device of claim 10, wherein:
a resonant frequency of the communication mode is changed when an inductance of the inductor of the second unit-cell is changed; and
a resonant frequency of the power transmission mode is unchanged when an inductance of the inductor of the first unit-cell is changed.

12. The device of claim 8, wherein:
the unit-cells are configured to operate in a −1 mode, a mu-zero resonance (MZR) mode, an epsilon-zero resonance (EZR) mode, and a +1 mode, respectively; and
the MZR mode and the EZR mode are simultaneously operated.

13. The device of claim 12, wherein the −1 mode, the MZR mode, the EZR mode, and the +1 mode comprise different respective resonant frequencies.

14. A device in a wireless power transmission system, the device comprising:
a multi-mode resonator comprising
a transmission line portion comprising unit-cells, wherein each unit-cell comprises a via and a respective end connected to another unit-cell,
a ground conducting portion configured to provide an electrical ground to the transmission line portion through the via of each of the unit-cells, and shield a magnetic field of the transmission line portion from the system; and
a system configured to receive a wireless power from another device through the multi-mode resonator, and to supply the wireless power to a load;
wherein the multi-mode resonator is configured to generate a resonance mode configured to be used with any of a communication and a power transmission.

15. The device of claim 14, wherein each of the unit-cells comprises:
a capacitor; and
an inductor connected in parallel to the capacitor.

16. The device of claim 15, wherein the unit-cells comprise:
a first unit-cell configured to operate in a power reception mode to receive the wireless power from another resonator using a resonance scheme; and
a second unit-cell configured to operate in a communication mode to receive data from the other resonator;
wherein the wireless power and the data are simultaneously received.

17. The device of claim 16, wherein:
a resonant frequency of the communication mode is changed when an inductance of the inductor of the second unit-cell is changed; and
a resonant frequency of the power reception mode is unchanged when an inductance of the inductor of the first unit-cell is changed.

18. The device of claim 14, wherein:
the unit-cells are configured to operate in a −1 mode, a mu-zero resonance (MZR) mode, an epsilon-zero resonance (EZR) mode, and a +1 mode, respectively; and
the MZR mode and the EZR mode are simultaneously operated.

19. The device of claim 18, wherein:
the −1 mode and the EZR mode are used to perform near field communication (NFC);
the MZR mode is used to perform power reception; and
the +1 mode is used to perform radio frequency (RF) communication or the NFC.

20. The device of claim 14, wherein the units are configured to operate in a number of modes based on a number of the unit-cells.

* * * * *